(12) United States Patent
Kimoto et al.

(10) Patent No.: US 6,611,102 B2
(45) Date of Patent: Aug. 26, 2003

(54) TUNGSTEN-HALOGEN LIGHT BULB, AND REFLECTOR LAMP USING THE SAME

(75) Inventors: Mituhiko Kimoto, Nara (JP); Taku Ikeda, Osaka (JP); Hiroshi Sugimoto, Osaka (JP); Takeshi Fujikawa, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 146 days.

(21) Appl. No.: 09/798,754

(22) Filed: Mar. 2, 2001

(65) Prior Publication Data

US 2001/0028221 A1 Oct. 11, 2001

(30) Foreign Application Priority Data

Mar. 10, 2000 (JP) ........................................ 2000-066529

(51) Int. Cl.$^7$ ................................................. H01K 1/40
(52) U.S. Cl. ...................... 313/637; 313/113; 313/568; 313/569; 313/570; 313/576; 313/578; 313/579
(58) Field of Search ................................. 313/113, 568, 313/569, 570, 578, 579, 637, 643, 576, 641, 642; 348/786; 359/614

(56) References Cited

U.S. PATENT DOCUMENTS 4,857,804 A * 8/1989 Griffin ......................... 313/579
6,060,820 A * 5/2000 Noll et al. .................... 313/113
6,204,598 B1 * 3/2001 Bruggemann et al. ....... 313/315
6,239,550 B1 * 5/2001 Maeda ......................... 313/112

FOREIGN PATENT DOCUMENTS

JP       10-228887       8/1998

* cited by examiner

*Primary Examiner*—Vip Patel
*Assistant Examiner*—Sharlene Leurig
(74) *Attorney, Agent, or Firm*—Merchant & Gould P.C.

(57) ABSTRACT

The present invention provides a tungsten-halogen light bulb having an arc tube with a seal portion at one end. A filament is provided in the interior of the arc tube, and a basic gas mainly comprising at least either gaseous xenon or gaseous krypton is filled in the arc tube. When V (V) denotes a rated voltage of the tungsten-halogen light bulb, P(MPa) denotes a filling pressure of the basic gas at a room temperature, and Xe vol. % and Kr vol. % respectively denote composition ratios of the gaseous xenon and of the gaseous krypton, the following formulas (1) and (2) are satisfied simultaneously, in which '%' means 'volume %'.

$$V \geq 100 \text{ (Volt)} \tag{1}$$

$$P \geq 0.7 + \{0.1 \times (Kr\%/(Kr\% + Xe\%))\} \tag{2}$$

In these formulas, Kr %+Xe %=100(%), $0 \leq Kr \% \leq 100$, and $0 \leq Xe \% \leq 100$. Accordingly, a crack at the seal portion of the arc tube is prevented and the lifetime is improved.

18 Claims, 2 Drawing Sheets

TUNGSTEN-HALOGEN LIGHT BULB, AND REFLECTOR LAMP USING THE SAME

FIELD OF THE INVENTION

The present invention relates to a tungsten-halogen light bulb and a reflector lamp using the tungsten-halogen light bulb.

BACKGROUND OF THE INVENTION

Tungsten-halogen light bulbs generally are used for lighting at shops and residences.

Conventionally, such tungsten-halogen light bulbs can be classified into a low-voltage type and a high-voltage type. Low-voltage type refers chiefly to a light bulb rated at 12V, while high-voltage type refers to, for example, a light bulb rated at 100V or 110V in Japan, 120V in the United States, and 230V or 240V in Europe. The tungsten-halogen light bulbs can be classified further into a single-based type bulb having a seal portion at only one end, and a double-based type bulb having seal portions at the both ends.

Among the above-identified conventional tungsten-halogen light bulbs, a single-based tungsten-halogen light bulb has an arc tube, and one end of the arc tube is sealed. Inside the arc tube, a filament and two inner lead wires holding this filament are provided. Moreover in the arc tube, a basic gas mainly comprising gaseous xenon, gaseous krypton, gaseous argon or the like is filled.

A base is fixed with an adhesive at the seal portion.

The inner lead wires are connected to outer lead wires through a metal foil sealed at the seal portion. These outer lead wires are connected to the base.

For such a single-based tungsten-halogen light bulb, especially when it is a tungsten-halogen light bulb of a high-voltage type, the pressure for filling the basic gas at a room temperature (25° C.) is decreased to, for example, 0.2 MPa or less in order to reduce damage to the arc tube.

In such a high-voltage type tungsten-halogen light bulb, however, the filament will be broken at the end of the lifetime. As a result, arc discharge will be induced between the cross sections of the broken filament. This arc discharge shifts in the inner lead wires to the vicinity of the seal portion, and causes thermal shock, and thus, cracks will occur at the seal portion. Specifically, this thermal shock is caused by the arc discharge and also by heat at the overheated inner lead wires.

Furthermore, in the conventional high-voltage type tungsten-halogen light bulb, tungsten in the filament evaporates, and this triggers breakdown of the filament to shorten the lifetime.

SUMMARY OF THE INVENTION

To solve the above-mentioned problems, the present invention provides a tungsten-halogen light bulb and a reflector lamp using the tungsten-halogen light bulb. The tungsten-halogen light bulb can prevent crack occurrence at the seal portion of the arc tube and it has a long life.

To achieve the above-mentioned purpose, a tungsten-halogen light bulb of the present invention has an arc tube having a seal portion at one end. A filament is provided in the arc tube, and a basic gas mainly comprising at least either gaseous xenon or gaseous krypton is filled in the arc tube.

When V (Volt) denotes a rated voltage of the tungsten-halogen light bulb, P(MPa) denotes a filling pressure of the basic gas at a room temperature, and Xe vol. % and Kr vol. % respectively denote composition ratios of the gaseous xenon and the gaseous krypton, the following formulas (1) and (2) are satisfied at the same time.

$$V \geq 100 \text{ (Volt)} \tag{1}$$

$$P \geq 0.7 + \{0.1 \times (Kr\%/(Kr\% + Xe\%))\} \tag{2}$$

In these formulas, Kr %+Xe %=100(%), $0 \leq Kr\% \leq 100$, and $0 \leq Xe\% \leq 100$.

A reflector lamp of the present invention comprises a tungsten-halogen light bulb and a reflector provided with a front glass. The tungsten-halogen light bulb has an arc tube with a seal portion at one end. A filament is provided in the interior of the arc tube and a basic gas mainly comprising at least either gaseous xenon or gaseous krypton is filled in the arc tube.

When V (Volt) denotes a rated voltage of the tungsten-halogen light bulb, P(MPa) denotes a filling pressure of the basic gas at a room temperature, and Xe vol. % and Kr vol. % respectively denote composition ratios of the gaseous xenon and the gaseous krypton, the following formulas (1) and (2) are satisfied at the same time.

$$V \geq 100 \text{ (Volt)} \tag{1}$$

$$P \geq 0.7 + \{0.1 \times (Kr\%/(Kr\% + Xe\%))\} \tag{2}$$

In these formulas, Kr %+Xe %=100(%), $0 \leq Kr\% \leq 100$, and $0 \leq Xe\% \leq 100$.

Accordingly, the present invention provides a long-life tungsten-halogen light bulb that can prevent crack occurrence at the seal portion, and the present invention provides also a reflector lamp using the tungsten-halogen light bulb.

DETAILED DESCRIPTION OF THE INVENTION

Figure 1:
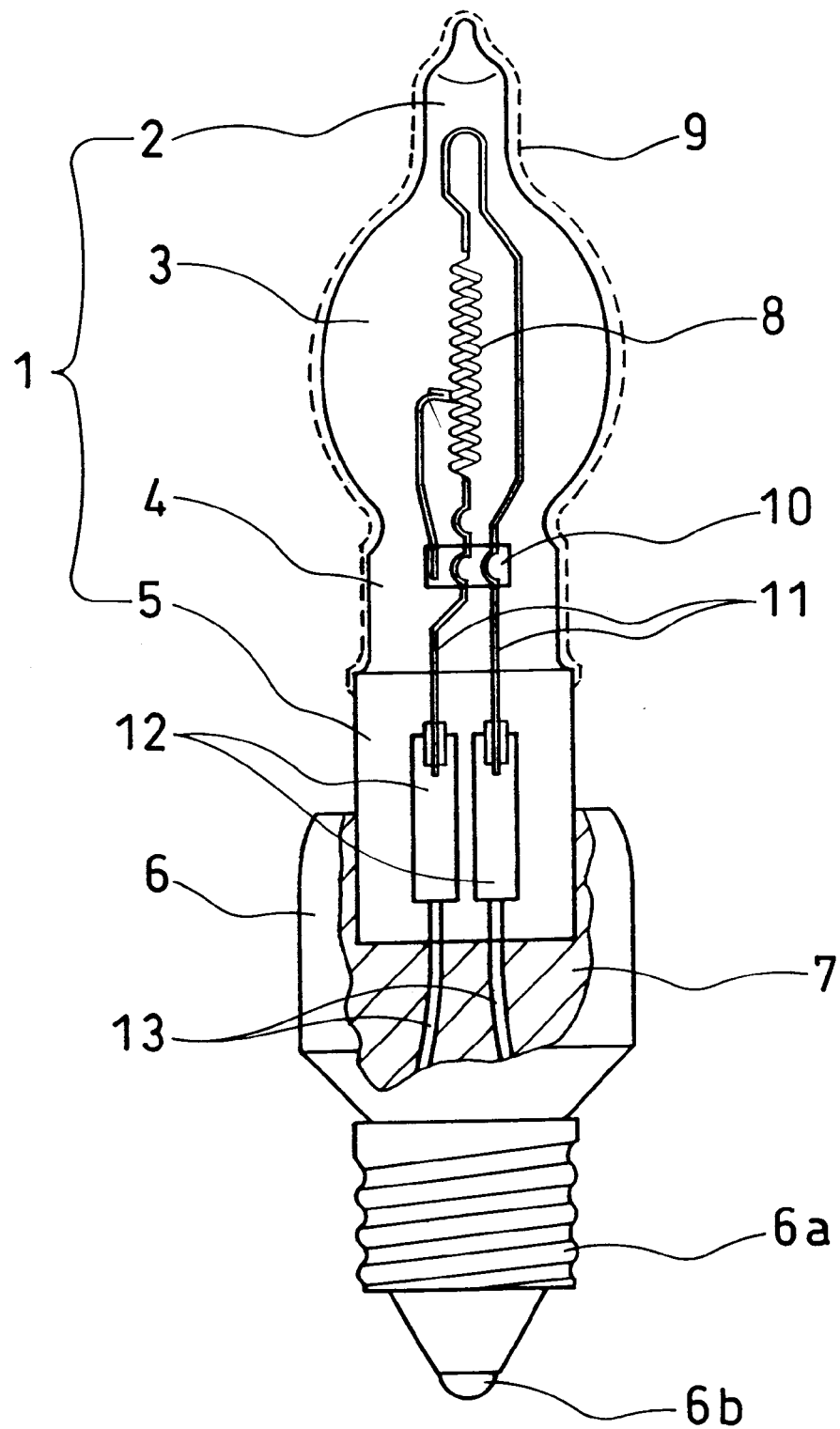
FIG. 1 is a partial cutaway front view of a tungsten-halogen light bulb according to one embodiment of the present invention.

According to the present invention, since arc discharge occurring between cross sections of a broken filament can be prevented from shifting to the seal portion, cracks at the seal portion caused by thermal shock can be prevented. Moreover, since evaporation of tungsten of the filament can be reduced, the filament will be resistant to breakage.

In the present invention, a practical voltage range for the formula (1) is from 100 to 380 V.

In formula (2), gaseous xenon is distinguished from gaseous krypton in the lower limit of the filling pressure. When gaseous xenon is used alone, the filling pressure is at least 0.7 MPa, while the filling pressure is at least 0.8 MPa when gaseous krypton is used alone. Since krypton has an atomic radius smaller than that of xenon, the mean free path of krypton is longer than that of xenon. As a result, when gaseous krypton is used alone, ionization probability provided by electrons will be higher when compared to a case where gaseous xenon is used alone. This may cause more arc discharge, and thus, the gas pressure will rise.

It is preferable in a tungsten-halogen light bulb and a reflector lamp of the present invention that the formula (2) is $P \geq 1.0 + \{0.1 \times (Kr\%/(Kr\% + Xe\%))\}$, and in the formula, Kr %+Xe %=100(%), 0≦Kr %≦100, and 0≦Xe %<100. Accordingly, crack occurrence caused by thermal shock at a seal portion can be prevented without using a protective current fuse, and damage rate of the arc tube can be lowered.

It is also preferable that gaseous nitrogen is added to the basic gas. Accordingly, arc discharge across the filament can be controlled during lighting. A preferable amount of the added gaseous nitrogen ranges from 5 to 20 vol. % to the whole basic gas.

It is preferable that a halogenated compound is further added to the basic gas.

It is preferable that the halogenated compound is methylene bromide ($CH_2Br_2$).

Preferably, the amount of the halogenated compound ranges from 5 to 1500 ppm to the whole basic gas.

It is preferable for improving safety that a protective current fuse further is provided to shut off the current supply to the filament when the filament is broken during lighting.

It is preferable that the filling pressure P (MPa) of the basic gas at a room temperature has a relationship with the wire diameter (mm) of the protective current fuse as follows. When P=0.7(MPa), the wire diameter is 0.24 mm or less. When P=0.8(MPa), the wire diameter is 0.28 mm or less. And, when P=0.9(MPa), the wire diameter is 0.30 mm or less. Accordingly, the proper protective current fuse for the filling pressure of the gas at a room temperature can be selected.

Preferably, $(T_{min}-T_h)>0$ when $T_{min}$ is a minimum duration (msec) of arc discharge, and $T_h$ is a fusing time (msec) of the protective current fuse. Accordingly, the protective current fuse will be fused before the arc tube is damaged.

Embodiments

Embodiments of the present invention will be explained with referring to FIGS. 1 and 2. In this description, '%' means volume % if there is no specific explanation.

(Embodiment 1)

Figure 2:
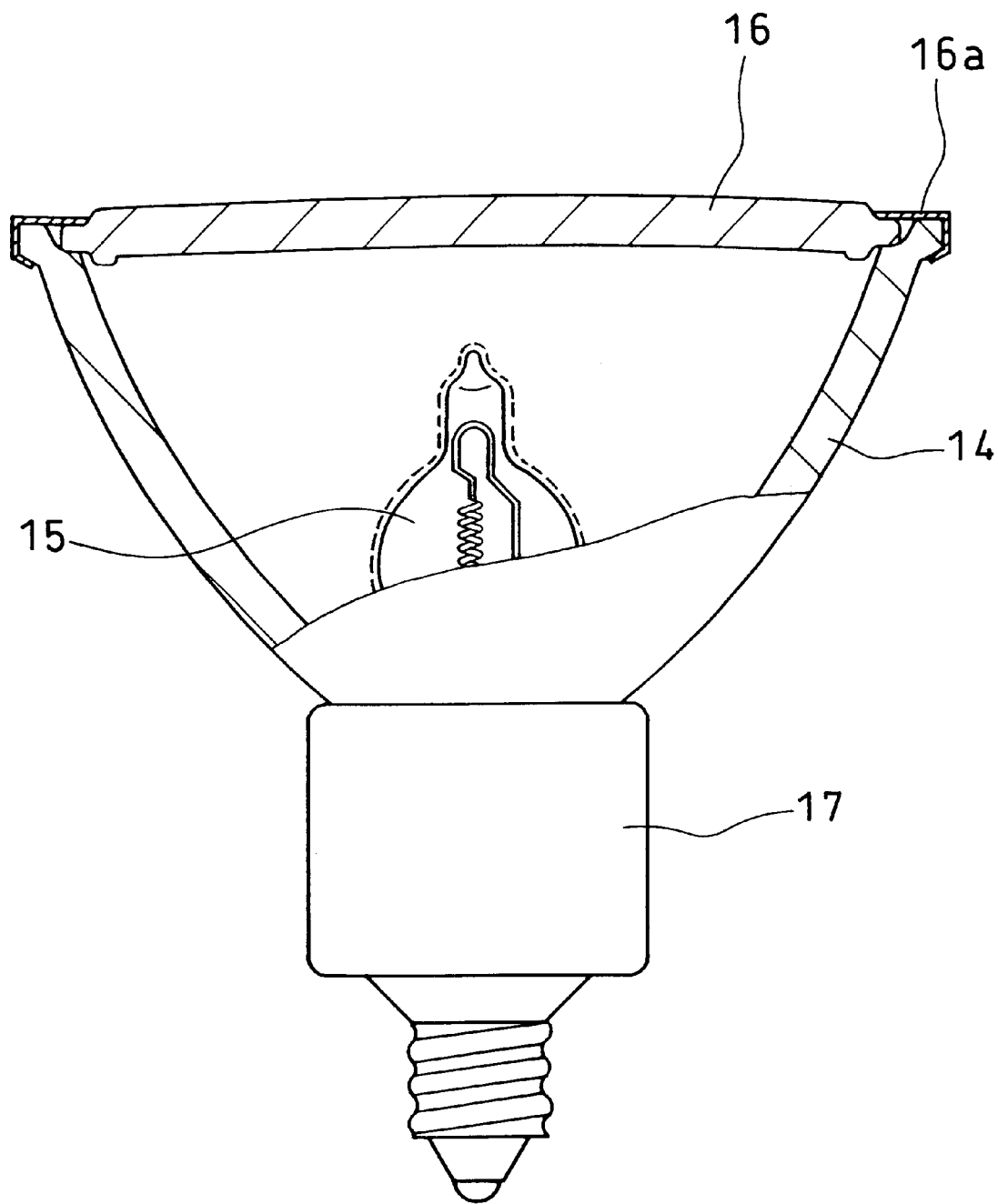
FIG. 2 is a partial cutaway front view of a reflector lamp according to one embodiment of the present invention.

A single-based tungsten-halogen light bulb rated at 110V (rated at 65 W) that is used in Embodiment 1 of the present invention comprises an arc tube 1 of quartz glass as shown in FIG. 1. The arc tube 1 has a total length of 44 mm and a maximum outer diameter of 14 mm.

The arc tube 1 comprises a closed portion 2, an elliptic light-emitting portion 3, a cylindrical portion 4 and a seal portion 5 in this order.

To an end of the seal portion 5 of the arc tube 1, a base 6 is fixed with an adhesive 7.

In the arc tube 1, a basic gas is filled. The basic gas mainly comprises at least either gaseous xenon or gaseous krypton, and gaseous nitrogen and a trace halogenated compound such as methylene bromide ($CH_2Br_2$) are also added.

In this description, the term 'mainly comprising' is used to indicate that the content of a component in the basic gas is at least 40%. Therefore, at least either the gaseous xenon or the gaseous krypton should be included to be at least 40% of the basic gas as a whole. Alternatively, the total of the included gaseous xenon and gaseous krypton is at least 40%.

Since gaseous nitrogen is included in the basic gas, the occurrence of arc discharge across a filament 8 can be controlled during lighting as described below. Preferably, an amount of the added gaseous nitrogen is 5 to 20% to the whole basic gas. When the amount of the gaseous nitrogen is lower than 5%, control of the arc discharge occurrence will be difficult. When the amount of the gaseous nitrogen exceeds 20% of the basic gas as a whole, the temperature of the filament 8 is lowered and the light-emitting efficiency may deteriorate.

An infrared reflecting film 9 comprising a multilayered interference film of tantalum oxide ($Ta_2O_5$) and silicon oxide ($SiO_2$) is formed on the outer surface of the arc tube 1 excepting the seal portion 5.

The filament 8 comprising tungsten is provided at the interior of the light-emitting portion 3. This filament 8 is connected to inner lead wires 11 comprising tungsten that are held at a quartz cylindrical stem 10 at both the ends.

The inner lead wires 11 are connected to outer lead wires 13 comprising molybdenum through a molybdenum foil 12 sealed in the seal portion 5. Also the outer lead wires 13 are connected respectively to metal fittings (6a, 6b) of the base 6.

It is preferable that a protective current fuse (not shown) is provided between the outer lead wire 13 and the metal fitting 6a of the base 6 in order to shut off the current supply to the filament 8 when the filament 8 is broken during lighting.

In this embodiment, fifty tungsten-halogen light bulbs were prepared for each group of lamps A–S shown in Table 1. For the lamps A–S, pressure to fill the basic gas (hereinafter referred to as a filling pressure P) was varied from 0.1 MPa to 1.5 MPa at a room temperature of 25° C. The composition ratio of gaseous xenon to gaseous nitrogen in the basic gas was 88:12, and 200 ppm of methylene bromide also was added to the basic gas. Each tungsten-halogen light bulb was dropped to provide a mechanical shock while it was lighting in a horizontal state in order to break the filament intentionally. Subsequently, crack occurrence rate at the seal portions 5 and damage rate of the arc tubes 1 were studied to obtain the shown in Table 1.

TABLE 1

| Example No. | Lamp No. | Protective current fuse | Filling pressure at room temp. (MPa) | Crack occurrence rate at seal portion (%) | Damage rate of arc tube (%) | Evaluation |
|---|---|---|---|---|---|---|
| 1 | A | No | 0.1 | 96 | 0 | Poor |
| 2 | B | No | 0.2 | 95 | 0 | Poor |
| 3 | C | No | 0.3 | 45 | 55 | Poor |
| 4 | D | No | 0.4 | 14 | 86 | Poor |
| 5 | E | No | 0.5 | 10 | 72 | Poor |
| 6 | F | No | 0.6 | 5 | 32 | Poor |
| 7 | G | No | 0.7 | 0 | 12 | Good |
| 8 | H | No | 0.8 | 0 | 6 | Good |
| 9 | I | No | 0.9 | 0 | 3 | Good |
| 10 | J | No | 1.0 | 0 | 0 | Excellent |
| 11 | K | No | 1.1 | 0 | 0 | Excellent |
| 12 | L | No | 1.2 | 0 | 0 | Excellent |
| 13 | M | No | 1.3 | 0 | 0 | Excellent |
| 14 | N | No | 1.4 | 0 | 0 | Excellent |
| 15 | O | No | 1.5 | 0 | 0 | Excellent |
| 16 | P | Yes | 0.7 | 0 | 0 | Excellent |
| 17 | Q | Yes | 0.8 | 0 | 0 | Excellent |
| 18 | R | Yes | 0.9 | 0 | 0 | Excellent |
| Conventional technique | S | Yes | 0.2 | 2 | 0 | Poor |

In Table 1, 'good' indicates that crack occurrence rate at seal portions 5 is 0%. 'Excellent' indicates that both crack occurrence rate at seal portions 5 and damage rate of the arc tubes 1 are 0%. The remaining lamps are marked 'poor'.

"Damage of arc tube" indicates that the arc tube 1 is fractured to cause leakage.

The lamps of Examples 1–15 are not provided with any protective current fuses. The lamps of Examples 16–18 and lamps of the conventional technique are provided with protective current fuses.

As shown in Table 1, crack occurrence rates at seal portions 5 for lamps G, H and I were 0% though few fractures were observed in the arc tubes 1. Regarding the lamps J, K, L, M, N, O, P, Q and R, both the crack occurrence rates at the seal portions 5 and damage rates of the arc tubes 1 were 0%.

This means that crack occurrence at a seal portion 5 can be prevented by setting the filling pressure to be not less than 0.7 MPa. Especially when the filling pressure is set to be not less than 1.0 MPa, crack occurrence at the seal portion 5 can be prevented, and damage of the arc tube 1 can be also prevented. Crack occurrence at the seal portions 5 and damage of the arc tubes 1 can be prevented even when the filling pressure P is not less than 0.7 MPa but less than 1.0 MPa if protective current fuses are provided.

Some lamps of groups C, D, E, and F had cracks at the seal portions 5, and/or the arc tubes 1 (specifically, the seal portions 5) were damaged because of the cracks at the seal portions 5. Especially for some lamps of groups E and F, the arc tubes 1 (i.e., the light-emitting portions) were damaged regardless of cracks at the seal portions 5. For lamps A and B, cracks occurred at the seal portions 5 though the arc tubes 1 were not damaged. The lamps S (conventional technique) had cracks at the seal portions even though protective current fuses were provided.

An arc tube 1 used for a tungsten-halogen light bulb in an embodiment of the present invention cannot resist a filling pressure P of 5.0 MPa or more, and thus cracks will occur. The upper limit of the filling pressure P varies depending on materials and thickness or the like of the arc tube 1.

The inventors classified the filling pressure P into five regions: region A where the filling pressure P ranges from 0.1 MPa to 0.2 MPa; region B where the filling pressure P is higher than 0.2 MPa but not higher than 0.4 MPa; region C where the filling pressure P is higher than 0.4 MPa but lower than 0.7 MPa; region D where the filling pressure P is 0.7 MPa or higher but lower than 1.0 MPa; and region E where the filling pressure P is 1.0 MPa or higher. The inventors observed arc discharge phenomena inside the arc tube for the respective regions by using a video camera and an oscilloscope.

According to the observation with regard to the region A, the arc discharge induced between the cross sections of the broken filament 8 shifted to the seal portion 5 and subsequently was extinguished and stopped at the seal portion 5. This will be referred to as an arc discharge shift mode.

A similar arc discharge shift mode occurs in the region B. However, the period that the arc discharge is maintained in the vicinity of the seal portion 5 was a little long, when compared to the arc discharge shift mode in the region A.

In the region C, an arc discharge shift mode was maintained while the following two arc discharge phenomena occurred. One phenomenon was that the arc discharge induced between the cross sections of the broken filament 8 did not shift to the seal portion 5 but lingered inside the light-emitting portion 3. Hereinafter, this will be referred to as an arc discharge lingering mode. This probably occurs because discharge destruction energy between the inner lead wires 11 is increased by a rise of the filling pressure P and the arc discharge stops shifting to the seal portion 5. The other phenomenon was immediate extinction of the arc discharge that had been induced between the cross sections of the broken filament 8. This phenomenon will be referred to as an arc discharge extinction mode. It can be assumed that this occurs since discharge retaining voltage of the induced arc discharge becomes higher than the rated voltage of the lamp due to the rise of the filling pressure P.

In the region D, the arc discharge shift mode was extinguished and the arc discharge lingering mode was decreased, so that the arc discharge extinction mode became predominant.

In the region E, the arc discharge lingering mode was extinguished, and only the arc discharge extinction mode existed.

In light of the above-mentioned fact, it can be estimated that a crack at the seal portion 5 can be caused by occurrence of the arc discharge shift mode. In other words, cracks can occur at the seal portion 5 due to the thermal shock of the arc discharge that had been induced and shifted to the seal portion 5, and also due to the thermal shock caused by the overheated inner lead wires 11.

It can be estimated that the arc tube 1 is damaged due to a crack occurring at the seal portion 5. Such damage is considered to occur because the duration of the arc discharge in the arc discharge shift mode is extended.

When the arc tube 1 is damaged regardless of a crack at seal portion 5, a cause of the damage is considered to be the occurrence of the arc discharge lingering mode. In other words, the light-emitting portion 3 can be damaged due to thermal shock of the induced and lingering arc discharge. However, damage of the arc tubes 1 of lamps E and F includes fractures of the seal portions 5, and the fractures are caused by cracks at the seal portions 5.

Therefore, it can be estimated that when the filling pressure P of the basic gas at the room temperature was set to be not less than 0.7 MPa, a crack at the seal portion 5 did not occur since the arc discharge shift mode was extinguished.

Fractures at the light-emitting portions 3 did not occur when the filling pressure P of the basic gas at a room temperature was set to be not less than 1.0 MPa, probably since the arc discharge shift mode and the arc discharge lingering mode were extinguished.

Next, fifty tungsten-halogen light bulbs were prepared for every lamp group. The tungsten-halogen light bulbs did not have any protective current fuses, and the filling pressure P of the basic gas at a room temperature was varied from 0.1 MPa to 1.4 MPa. The basic gas contained gaseous krypton and gaseous nitrogen and the ratio of the gaseous krypton to the gaseous nitrogen was 88:12, and the basic gas contained also 200 ppm of ethylene bromide. Crack occurrence rate at the seal portions 5 and damage rate of the arc tubes 1 were examined under the same condition of the lamps containing basic gas mainly comprising gaseous xenon, so that results shown in the following Table 2 were obtained.

TABLE 2

| Example No. | Lamp No. | Protective current fuse | Filling pressure at room temp. (MPa) | Crack occurrence rate at seal portion (%) | Damage rate of arc tube (%) | Evaluation |
|---|---|---|---|---|---|---|
| 19 | A' | No | 0.1 | 96 | 0 | Poor |
| 20 | B' | No | 0.2 | 96 | 0 | Poor |
| 21 | C' | No | 0.3 | 65 | 35 | Poor |
| 22 | D' | No | 0.4 | 30 | 70 | Poor |
| 23 | E' | No | 0.5 | 17 | 83 | Poor |
| 24 | F' | No | 0.6 | 15 | 64 | Poor |
| 25 | G' | No | 0.7 | 4 | 28 | Poor |
| 26 | H' | No | 0.8 | 0 | 12 | Good |
| 27 | I' | No | 0.9 | 0 | 6 | Good |
| 28 | J' | No | 1.0 | 0 | 2 | Good |
| 29 | K' | No | 1.1 | 0 | 0 | Excellent |
| 30 | L' | No | 1.2 | 0 | 0 | Excellent |
| 31 | M' | No | 1.3 | 0 | 0 | Excellent |
| 32 | N' | No | 1.4 | 0 | 0 | Excellent |

TABLE 2-continued

| Example No. | Lamp No. | Protective current fuse | Filling pressure at room temp. (MPa) | Crack occurrence rate at seal portion (%) | Damage rate of arc tube (%) | Evaluation |
|---|---|---|---|---|---|---|
| 33 | O' | Yes | 0.8 | 0 | 0 | Excellent |
| 34 | P' | Yes | 0.9 | 0 | 0 | Excellent |
| 35 | Q' | Yes | 1.0 | 0 | 0 | Excellent |
| 36 | R' | Yes | 0.2 | 1 | 0 | Poor |

Table 2 shows that when the filling pressure P was 0.8 MPa or more, the crack occurrence rate at the seal portions 5 was 0%. When the filling pressure P was 0.7 MPa or less, the crack occurrence rate at the seal portions 5 was 4% or more. Accordingly, the crack occurrence at the seal portions 5 can be prevented when the filling pressure P of a basic gas mainly comprising gaseous krypton is 0.8 MPa or more at a room temperature.

It should be noted particularly that when the filling pressure P was 1.1 MPa or more, the damage rate of the arc tubes 1 was 0%. It is clear from this fact that crack occurrence at the seal portions 5 and also damage of the arc tubes 1 can be prevented when the filling pressure P of a basic gas mainly comprising gaseous krypton is at least 1.1 MPa at a room temperature.

Next, the lifetimes of lamps B and G in Table 1 were studied.

In measurement of the lifetime, a cycle of 2.5 hours of lighting and 0.5 hours of turnoff was repeated.

The lifetime of lamps G was 3250 hours. For the lamps B, the lifetime was 1850 hours. The reason can be as follows. Since lamps G had high filling pressure P compared to that of lamps B, evaporation of tungsten in the filament 8 was controlled.

As mentioned above, the crack occurrence at the seal portion 5 can be prevented and the lifetime can be extended when a filament 8 is provided in the interior of an arc tube 1 having a seal portion 5 at one end, and when a basic gas comprising at least either gaseous xenon or gaseous krypton is filled to satisfy the following formulas: $V \geq 100$ (V) and $P \geq 0.7 + \{0.1 \times (Kr \% / (Kr \% + Xe \%))\}$. In the formulas, V(V) denotes a rated voltage, P(MPa) denotes a filling pressure of a basic gas at a room temperature, and Xe % and Kr % denote respectively composition ratios of gaseous xenon and gaseous krypton. In these formulas, $Kr \% + Xe \% = 100(\%)$, $0 \leq Kr \% \leq 100$, and $0 \leq Xe \% \leq 100$.

It should be particularly noted that damage of the arc tube 1 can be prevented by satisfying the following formula: $P \leq 1.0 + \{0.1 \times (Kr \% / (Kr \% + Xe \%))\}$, where $Kr \% + Xe \% = 100(\%)$, $0 \leq Kr \% \leq 100$, and $0 \leq Xe \% \leq 100$.

Furthermore, when a tungsten-halogen light bulb having a protective current fuse satisfies the following formulas, the wire diameter of the protective current fuse can be made larger than that of a conventional tungsten-halogen light bulb (e.g., the lamps S):

$$V \geq 100 \ (V) \text{ and } P \geq 0.7 + \{0.1 \times (Kr\%/(Kr\% + Xe\%))\}.$$

In the formulas, V(V) denotes a rated voltage of the tungsten-halogen light bulb, P(MPa) denotes a filling pressure of a basic gas at a room temperature, and Xe % and Kr % respectively denote composition ratios of gaseous xenon and gaseous krypton; $Kr \% + Xe \% = 100(\%)$, $0 \leq Kr \% \leq 100$, and $0 \leq Xe \% \leq 100$. As a result, operations to connect the protective current fuse with a metal fitting 6a of a base 6 and to connect the protective current fuse with outer lead wires 13 can be simplified, and also the protective current fuse can be prevented from being broken.

(Embodiment 2)

In this embodiment, a protective current fuse having a large wire diameter can be used. The reason will be explained below. Table 3 shows a result of examination for a fusing time $T_h$(msec) by varying the wire diameter of the protective current fuse.

TABLE 3

| Wire diameter of protective current fuse (mm) | Fusing time $T_h$(msec) |
|---|---|
| 0.10 | 5.2 |
| 0.12 | 7.3 |
| 0.14 | 10.1 |
| 0.16 | 13.5 |
| 0.18 | 16.5 |
| 0.20 | 20.3 |
| 0.22 | 24.9 |
| 0.24 | 31.2 |
| 0.26 | 35.0 |
| 0.28 | 40.3 |
| 0.30 | 45.1 |
| 0.32 | 50.2 |

Table 4 shows results concerning the minimum duration $T_{min}$(msec) of arc discharge induced between cross sections of broken filaments for lamps A, G, H, and I.

TABLE 4

| Lamp No. | Minimum duration of arc discharge $T_{min}$(msec) |
|---|---|
| A | 8.3 |
| G | 34.3 |
| H | 43.2 |
| I | 50.2 |

Tables 3 and 4 show that damage of an arc tube 1 can be prevented by satisfying a formula of $(T_{min} - T_h) > 0$. This means that the protective current fuse is fused before the arc tube 1 is damaged.

Tables 3 and 4 demonstrate that the protective current fuse having a wire diameter of not more than 0.24 mm can be used for lamps G whose filling pressure P is 0.7 MPa. For lamps H having a filling pressure P of 0.8 MPa, the wire diameter of protective current fuses can be increased to 0.28 mm at most. For lamps I having a filling pressure P of 0.9 MPa, the wire diameter of the protective current fuse can be increased to 0.30 mm at most.

For lamps A, the wire diameter of protective current fuses is restricted to 0.12 mm or less.

According to the above-mentioned configurations, protective current fuses with larger wire diameter can be used.

The basic gas used in this embodiment contains at least either gaseous xenon or gaseous krypton, plus gaseous nitrogen. Similar effects can be obtained if gaseous argon or the like is added to this basic gas.

This embodiment relates to a case in which tungsten-halogen light bulbs rated at 65 W and at 110V are used. However, similar effects can be obtained by using tungsten-halogen light bulbs rated at 50 W or 90 W and at 100V, or tungsten-halogen light bulbs rated at 110V, 120V, 220V, 230V or 240V.

(Embodiment 3)

A reflector lamp according to one embodiment of the present invention comprises a spheroidal reflector 14 with a front opening 70 mm in diameter, a single-based tungsten-halogen light bulb 15 rated at 110V (rated at 65 W) provided inside the reflector 14, and a front glass 16 attached to the front of the reflector 14. Numeral 17 denotes a base.

The single-based tungsten-halogen light bulb 15 is configured similarly to a single-based tungsten-halogen light bulb rated at 110V (rated at 65 W) in Embodiment 1 of the present invention shown in FIG. 1, except that the base 6 is eliminated.

This single-based tungsten-halogen light bulb 15 is fixed to the base 17 with an adhesive (not shown).

The front glass 16 is fixed to the reflector 14 with a metal fitting 16a.

Thus-structured reflector lamp of one embodiment of the present invention can prevent crack occurrence at the seal portion and can extend the lifetime.

(Embodiment 4)

In place of the gas composition mainly comprising krypton as indicated in Embodiment 1, a gas mixture mainly comprising xenon and krypton, that is, $Xe:Kr:N_2=44:44:12$ was prepared, and 200 ppm of methylene bromide was added before filling the gas mixture in a light bulb. The results are shown in Table 5. The criteria and the like are identical to those in Embodiment 1.

TABLE 5

| Example No. | Lamp No. | Protective current fuse | Filling pressure at room temp. (MPa) | Crack occurrence rate at seal portion (%) | Damage rate of arc tube (%) | Evaluation |
|---|---|---|---|---|---|---|
| 37 | a | No | 0.1 | 96 | 0 | Poor |
| 38 | b | No | 0.2 | 95 | 0 | Poor |
| 39 | c | No | 0.3 | 55 | 45 | Poor |
| 40 | d | No | 0.4 | 22 | 78 | Poor |
| 41 | e | No | 0.5 | 13 | 77 | Poor |
| 42 | f | No | 0.6 | 10 | 48 | Poor |
| 43 | g | No | 0.7 | 2 | 20 | Poor |
| 44 | h | No | 0.8 | 0 | 9 | Good |
| 45 | i | No | 0.9 | 0 | 4 | Good |
| 46 | j | No | 1.0 | 0 | 1 | Good |
| 47 | k | No | 1.1 | 0 | 0 | Excellent |
| 48 | l | No | 1.2 | 0 | 0 | Excellent |
| 49 | m | No | 1.3 | 0 | 0 | Excellent |
| 50 | n | No | 1.4 | 0 | 0 | Excellent |
| 51 | o | Yes | 0.8 | 0 | 0 | Excellent |
| 52 | p | Yes | 0.9 | 0 | 0 | Excellent |
| 53 | q | Yes | 1.0 | 0 | 0 | Excellent |
| 54 | r | Yes | 0.2 | 1 | 0 | Poor |

Table 5 demonstrates that the crack occurrence rate at the seal portions was lowered when the filling pressure at a room temperature exceeded 0.8 MPa for a gas mixture mainly comprising xenon and krypton. The damage rate of the arc tube also was lowered and excellent evaluation results were obtained. It should be noted that good results were obtained for lamps having fuses when the filling pressure at a room temperature exceeded 1.0 MPa. For lamps without fuses, good results were obtained when the filling pressure at a room temperature exceeded 1.1 MPa.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, all changes that come within the meaning and range of equivalency of the claims are intended to be embraced therein.

What is claimed is:

1. A tungsten-halogen light bulb comprising an arc tube with a seal portion at an end, a filament is provided in an interior of the arc tube and a basic gas mainly comprising at least one gas selected from the group consisting of gaseous xenon and gaseous krypton is filled, wherein both formulas (1) and (2) are satisfied when V (Volt) is a rated voltage of the tungsten-halogen light bulb, P (MPa) is a filling pressure of the basic gas at a room temperature, and Xe vol. % and Kr vol. % are respectively composition ratios of the gaseous xenon and the gaseous krypton;

$$V \geq 100 \text{ (Volt)} \tag{1}$$

$$P \geq 1.0 + \{0.1 \times (Kr \text{ vol. }\%/(Kr \text{ vol. }\% + Xe \text{ vol. }\%))\} \tag{2}$$

where Kr vol. %+Xe vol. %=100(%), $0 \leq Kr$ vol. % $\leq 100$, and $0 \leq Xe$ vol. % $\leq 100$.

2. The tungsten-halogen light bulb according to claim 1, wherein the basic gas further comprises gaseous nitrogen.

3. The tungsten-halogen light bulb according to claim 2, wherein an amount of the added gaseous nitrogen to the whole basic gas ranges from 5 vol. % to 20 vol. %.

4. The tungsten-halogen light bulb according to claim 1, wherein the basic gas further comprises a halogenated compound.

5. The tungsten-halogen light bulb according to claim 4, wherein the halogenated compound is methylene bromide ($CH_2Br_2$).

6. The tungsten-halogen light bulb according to claim 4, wherein an amount of the added halogenated compound to the whole basic gas ranges from 5 ppm to 1500 ppm.

7. The tungsten-halogen light bulb according to claim 1, wherein a protective current fuse is further provided to shut off current supply to the filament when the filament is broken during lighting.

8. The tungsten-halogen light bulb according to claim 7, wherein wire diameter (mm) of the protective current fuse is not more than 0.24 mm when P=0.7 (MPa), not more than 0.28 mm when P=0.8 (MPa), and not more than 0.30 mm when P=0.9 MPa, where P denotes a filling pressure of the basic gas at a room temperature.

9. The tungsten-halogen light bulb according to claim 7, wherein $(T_{min}-T_h)>0$, when $T_{min}$ is a minimum duration (msec) of arc discharge, and $T_h$ is a fusing time (msec) of the protective current fuse.

10. A reflector lamp, comprising a tungsten-halogen light bulb in the lamp and a reflector provided with a front glass, and the tungsten-halogen light bulb comprises an arc tube with a seal portion at an end and a filament provided in an interior of the arc tube, and a basic gas mainly comprising at least one gas selected from the group consisting of gaseous xenon and gaseous krypton is filled, wherein both formulas (1) and (2) are satisfied when V (Volt) denotes a rated voltage of the tungsten-halogen light bulb, P (MPa) denotes a filling pressure of the basic gas at a room temperature, and Xe vol. % and Kr vol. % denote respectively composition ratios of the gaseous xenon and of the gaseous krypton;

$$V \geq 100 \text{ (Volt)} \tag{1}$$

$$P \geq 1.0 + \{0.1 \times (Kr \text{ vol. }\%/(Kr \text{ vol. }\% + Xe \text{ vol. }\%))\} \tag{2}$$

where Kr vol. %+Xe vol. %=100(%), $0 \leq Kr$ vol. % $\leq 100$, and $0 \leq Xe$ vol. % $\leq 100$.

11. The reflector lamp according to claim 10, wherein the basic gas further comprises gaseous nitrogen.

12. The reflector lamp according to claim 11, wherein an amount of the added gaseous nitrogen to the whole basic gas ranges from 5 vol. % to 20 vol. %.

13. The reflector lamp according to claim 10, wherein the basic gas further comprises a halogenated compound.

14. The reflector lamp according to claim 13, wherein the halogenated compound is methylene bromide ($CH_2Br_2$).

15. The reflector lamp according to claim 13, wherein an amount of the added halogenated compound to the whole basic gas ranges from 5 ppm to 1500 ppm.

16. The reflector lamp according to claim 10, wherein a protective current fuse is further provided to shut off current supply to the filament when the filament is broken during lighting.

17. The reflector lamp according to claim 16, wherein a wire diameter (mm) of the protective current fuse is not more than 0.24 mm when P=0.7 (MPa), not more than 0.28 mm when P=0.8 (MPa), and not more than 0.30 mm when P=0.9 MPa, where P denotes a filling pressure of the basic gas at a room temperature.

18. The reflector lamp according to claim 16, wherein $(T_{min}-T_h)>0$, when $T_{min}$ is a minimum duration (msec) of arc discharge, and $T_h$ is a fusing time (msec) of the protective current fuse.

* * * * *